United States Patent [19]
Ettinger et al.

[11] 3,721,890
[45] March 20, 1973

[54] POWER SUPPLY FOR A.C. AND D.C. DRIVE

[75] Inventors: James P. Ettinger; Christian S. Otteson, both of Ridgefield, Conn.

[73] Assignee: Electric Regulator Corporation, Norwalk, Conn.

[22] Filed: March 27, 1972

[21] Appl. No.: 238,082

[52] U.S. Cl. .................. 321/8 R, 307/151, 317/99, 321/8 C, 323/24
[51] Int. Cl. ............................................. H02m, H02b
[58] Field of Search ..... 323/24; 317/99; 307/85, 150, 307/151; 321/5, 8 R, 8 C

[56] References Cited

UNITED STATES PATENTS 3,641,419  2/1972  Koltuniak ........................... 321/8 C

FOREIGN PATENTS OR APPLICATIONS 874,043  6/1971  Canada .............................. 321/8 C

*Primary Examiner*—William H. Beha, Jr.
*Attorney*—Maxwell James et al.

[57] ABSTRACT

A power supply unit is disclosed including a modular power section which may be converted from D.C. to A.C. operation and vice versa merely by a change in bus bar configuration. The power modules are arranged side by side in two rows on a bus bar assembly on a back panel and comprise a silicon controlled rectifier clamped between a pair of electrically and thermally conductive plates. In the embodiment disclosed, the rectifiers in the top row are facing in one direction while the rectifiers in the bottom row are facing in the opposite direction. Means are provided on the back panel for mounting at least two different alternate bus bar assemblies, one of which is designed to connect the rectifiers in a first operative circuit arrangement for D.C. operation and the other of which is designed to connect the rectifiers in a second operative circuit arrangement for A.C. operation.

The modules are provided with a front panel having spaced apertures for access to the quick detachable captive nut assembles used to mount the clamping plates on the bus bars. Those apertures also serve as a convenient gripping means for handling individual modules for repair or replacement.

17 Claims, 14 Drawing Figures

POWER SUPPLY FOR A.C. AND D.C. DRIVE

This invention relates to a power supply and more particularly to a power unit adapted to convert A.C. utility power to controlled A.C. or D.C. power for use in driving variable speed motors and in other controlled power applications.

Conventionally, power supplies in the large power handling categories are extremely bulky, heavy and expensive. A traditional power unit of the type described designed to drive a multi-horsepower motor, e.g., one in the 150 h.p. range, comprises a piece of equipment the size of a medium truck and weighing up to 8 tons. Typically, such units consists of a combination of motors, generators and regulators linked together to change utility power to controlled output power. A significant disadvantage of power units of this type is that they must in large measure be individually designed for each specific application. For example, in D.C. drive units—where the utility power is in the form of A.C. and the motor to be driven is of the D.C. type—the power supply must convert the A.C. to D.C. while at the same time permitting control of the output power, so that, for example, the speed of the motor may be adjusted and then regulated to remain constant over a wide range of load conditions. As a result of the quite different performance requirements of A.C. and D.C. power units, these power drive applications have been relegated to completely different structures designed respectively to provide for those different performance requirements. As a result, such units are extremely limited as regards flexibility of use within a given plant or factory. In view of the high initial cost of such units, this lack of versatility substantially increases the expense of the equipment. For example, where there is need for both A.C. and D.C. controlled power, the cost is substantially doubled. In addition, if the application requirements change radically, as for instance where the plant is modernized by the replacement or addition of new equipment, a redesign and reconstruction of the power supply and in many cases the addition of a new power supply is generally required.

In addition to the high initial cost of such equipment, units of this type are extremely difficult to maintain and repair and these maintenance and repair costs are magnified when more than one unit is required in a given plant. Thus for example where different units (i.e., A.C. and D.C. drives) are not interchangeable, if anything goes wrong with one of those units, the motor driven thereby must remain idle during the time it takes to repair or adjust the power supply, and the apparatus driven by the motor is likewise idled (the size and cost of these units practically include the maintenance of a standby unit). The economic loss involved in the "down time" of power supplies is therefore an extremely significant factor.

Repair or replacement of such conventional power supplies, both of the A.C. and D.C. type, is typically quite time consuming and expensive. Often many properly working parts must be disassembled or disconnected merely to gain access to the defective element or elements. In addition, because of the factors outlined above, repair of such units involves considerable skill and highly trained maintenance personnel are often unavailable for this job.

In recent years with the development of solid state electronics, the use of semiconductor electronic components first for control functions and then for power handling functions to replace conventional electromechanical components has contributed significantly to the reduction in both size and weight of units of this type. Thus in effect, a second generation of power supplies utilizing solid state components has been developed. In addition to this quite significant reduction in size and weight, power supplies of this type have more recently been designed along modular lines wherein the various operative components, both power handling and control, are designed in the form of readily attachable and detachable modules, thereby to greatly facilitate repair, replacement and modification of electrical characteristics. As a result of all of the above, modern power supplies are generally small, light and compact solid state assemblies which are nevertheless capable of handling large amounts of power with an exceptionally high degree of safety and efficiency. An example of one such power supply is found in our copending application Ser. No. 702,089, filed Jan. 31, 1968 and entitled "Modular Power Supply".

While the modern power supply as described above is smaller, lighter and easier to maintain and repair than conventional electro-mechanical equipment of this type, these units are still quite expensive and still must be individually designed for each specific application. This is so notwithstanding the basic electronic components used for developing controlled output power for the various applications (i.e., driving A.C. and D.C. motors) of said units is substantially identical. The individual design of such units has presumably been necessitated by the requirements of adequate insulation, compact design and good heat dissipation for the different electronic circuit arrangements corresponding to different output requirements. As a result, for large plants having varying power requirements a number of such units (i.e., A.C. and D.C.) may be required thereby significantly increasing initial cost and maintenance and repair problems are thereby magnified.

It is a primary object of the present invention to design a power supply of the type described which eliminates substantially all of the foregoing problems by providing a versatility heretofore unattainable.

It is yet another object of the present invention to design a power supply of the small, lightweight solid state type which is adapted to provide controlled output power of either the A.C. or D.C. type merely by a minor change in bus bar configuration.

It is yet another object of the present invention to provide a power supply unit utilizing the modular approach and in which the standard electronic solid state components of each module may be connected within the same compact assembly to provide varying output characteristics for different units, such modules being interchangeable in all of such units.

To these ends the present invention comprises a power supply unit of the type described comprising a power handling section and a regulator unit mounted side by side on a back panel. The power handling section comprises the power handling circuitry in the form of six silicon control rectifiers each mounted separately in its own module with its own heat dissipating structure and disposed in side by side configuration to form an extremely compact rigid assembly. In accordance with a primary feature of this invention, that assembly may be utilized for driving both A.C. and D.C. motors depending upon the bus bar mounting structure utilized on the back panel. To that end the back panel is provided with a novel spaced insulating board having a plurality of apertures adapted to provide for mounting of two distinct bus bar configurations utilized for A.C. and D.C. drive, respectively. The novel bus bar configurations herein disclosed are made possible by a unique bus bar cross-over technique which is adapted to provide the proper electrical connections between the power handling silicon controlled rectifiers for either A.C. or D.C. operation. For this purpose controlled rectifier modules are mounted in pairs facing in opposite directions such that when mounted on the bus bar terminals for either A.C. or D.C. operation those rectifiers assume either a three-phase full wave D.C. bridge circuit for driving D.C. motors or a full wave A.C. phase controlled circuit for controlling starting current to an A.C. motor.

The bus bar configuration is characterized by a high degree of safety, particularly with regard to resistance overloads. Those bus bars serve not only to conduct power to the power handling modules via the heat dissipating structure but also serve to support those devices on the assembly in a particularly compact and rigid structure. Each of the solid state power handling power modules is self-contained and adapted to be directly mounted on and clamped to appropriate portions of either the A.C. or D.C. bus bars. The modules are so constructed and arranged that when they are in position, the hardware which serves to mount them on and insure proper electrical connection to the bus bars is readily accessible from the face of the unit through appropriate apertures in the front face of each module, so that individual modules may be removed and replaced in a matter of seconds, and by an extremely simple manual operation such as the turning of a nut. Those apertures in addition serve as handles to facilitate removal and replacement of individual modules.

The control and sensing circuit is enclosed in an elongated rectifier assembly mounted on the back panel adjacent the power handling units. Accordingly, the power section and regulator section of the power supply are mechanically as well as electrically separate, thus facilitating repair and maintenance. With the exception of the bus bar structure and the regulator unit and a shunt field power supply for D.C. operation, identical parts are used to manufacture both A.C. and D.C. drives. Moreover, to convert an A.C. to a D.C. drive or vice versa, it is merely necessary to detach the power handling modules, replace the bus bars on the back panel utilizing the same insulator plate, replaces the A.C. or D.C. regulator unit with a D.C. or A.C. regulator unit, respectively, remount the power handling units on the replaced bus bar structure and provide the operative wire connections between the regulator unit and the power section. As a result, conversion from A.C. to D.C. operation or vice versa is rapid and inexpensive, and may be done by unskilled personnel at the time and place where needed. Moreover, if a particular assembly has both A.C. and D.C. power supplies, the power modules may be interchanged for emergency repair or maintenance in a matter of seconds.

To the accomplishment of the above and to such other objects as may hereinafter appear, the present invention relates to the construction and arrangement of a modular power supply as defined in the appended claims and as described in the specification, taken together with the accompanying drawings, in which:

Figure 7A:
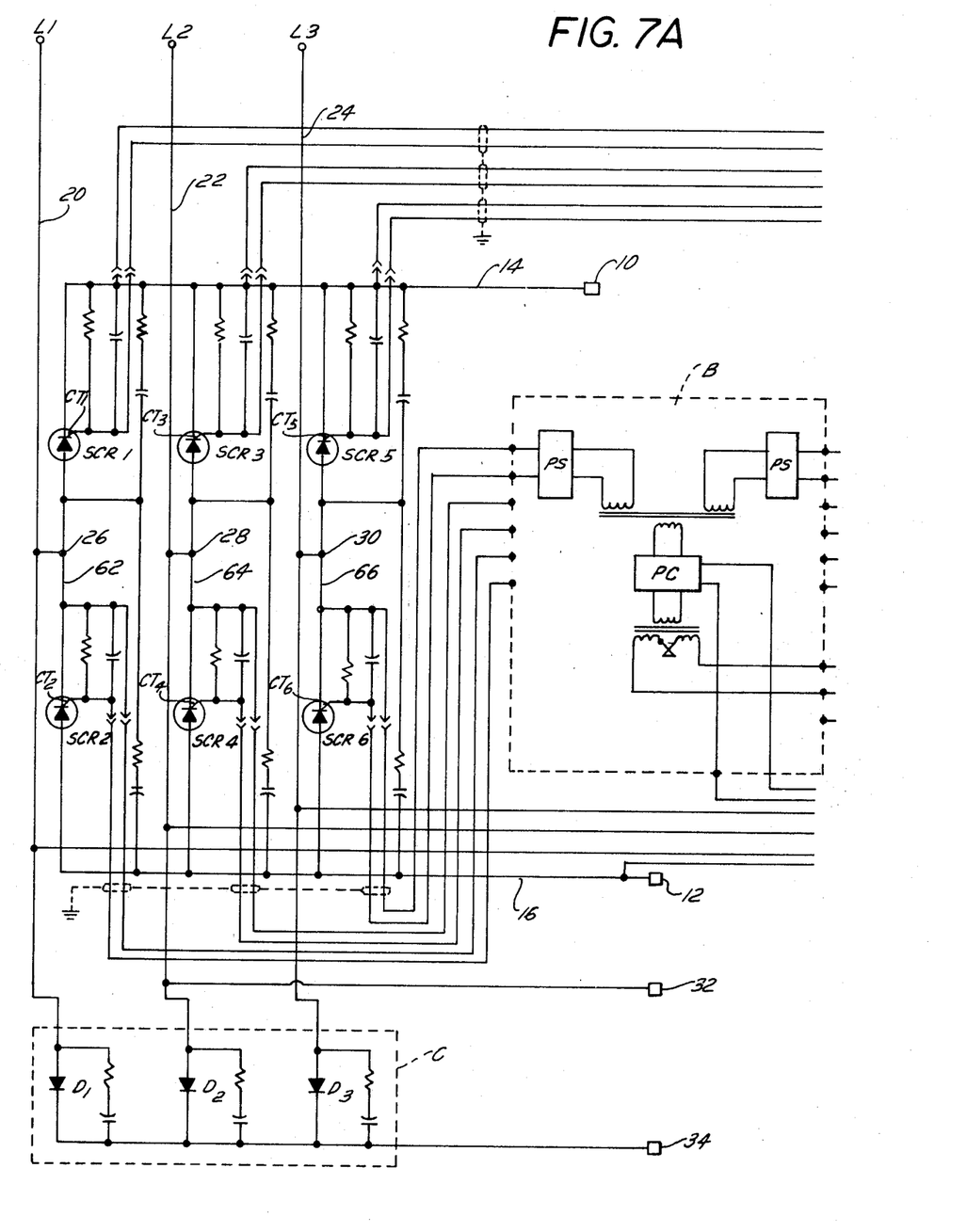
FIGS. 7A and 7B together are a complete circuit diagram of the power supply circuit as connected for D.C. operation.
Figure 10A:
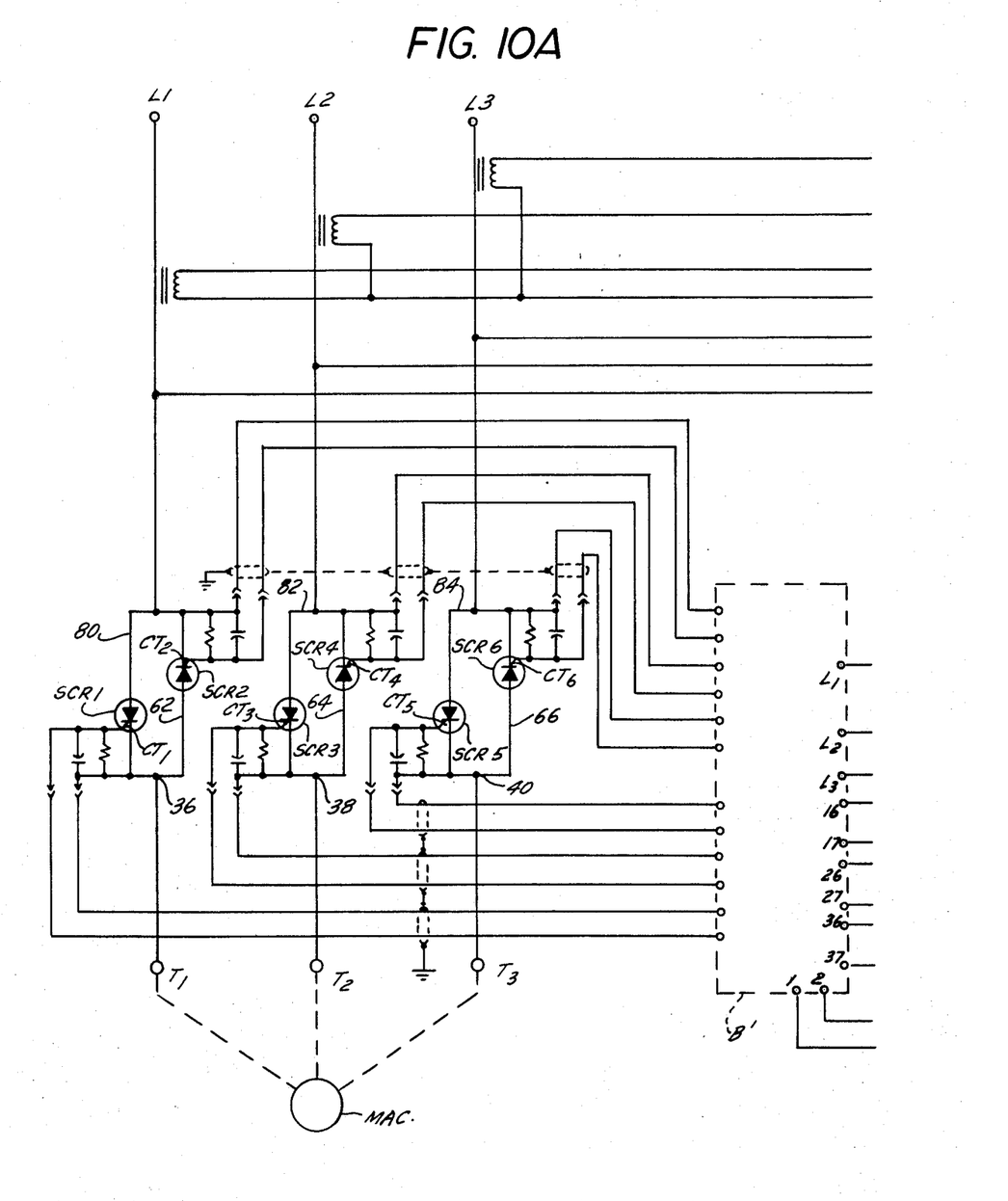
FIGS. 10A and 10B together are a complete circuit diagram of the power supply circuit as connected for A.C. operation.
Figure 10B:
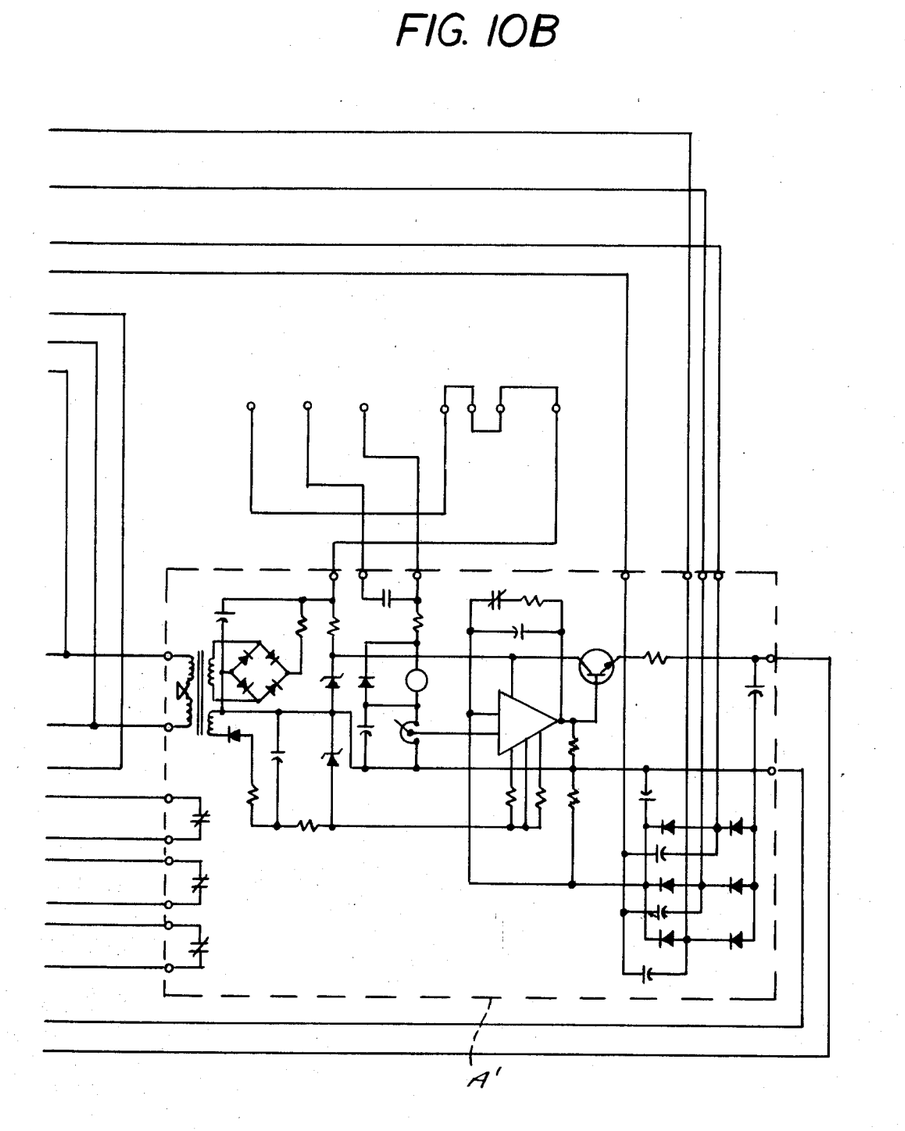

Referring to the drawings, and more particularly to the circuit diagram of FIGS. 7A and 10A, there is shown the basic control circuits for solid state D.C. and A.C. power units, respectively. The circuit illustrated in FIG. 7A is a conventional full wave D.C. bridge rectifying circuit specifically designed to convert a three-phase A.C. input into a controllable D.C. output which in turn is adapted to controllably drive a D.C. shunt field motor (not shown). The three-phase alternating current input is applied to the terminals designated L1, L2 and L3 and the D.C. output to the motor is provided at terminals 10 and 12, respectively. The power supply has power lines 14 and 16 connected to the terminals 10 and 12, respectively. Connected in parallel between the lines 14 and 16 are three pairs of series connected silicon controlled rectifiers here designated SCR1–SCR6. Line 62 connects the anode of SCR1 to the cathode of SCR3, line 64 connects the anode of SCR3 to the cathode of SCR4 and line 66 connects the anode of SCR5 to the cathode of SCR6. Lines 20, 22 and 24 are electrically connected to the input terminals L1, L2 and L3, respectively, and extend therefrom to points 26, 28 and 30 on lines 62, 64 and 66, respectively, between the control rectifiers SCR1 and SCR2, SCR3 and SCR4, SCR5 and SCR6, respectively. The control terminals here designated CT1–CT6 of rectifiers SCR1–SCR6 are each associated with appropriate control circuitry illustrated in FIG. 7B and enclosed in the broken line rectangle A. This circuitry includes capacitors, switches and magnetic amplifiers as well known in the art. In general, the circuit A provides both sensing and control for the power developed in the power circuit illustrated in FIG. 7A and includes adjustable means for controlling minimum speed, IR compensation, maximum current and maximum speed of operation of the motor, respectively. Control terminals CT1–CT6 are also operatively connected to a trigger circuit illustrated in FIG. 7A and enclosed within the broken rectangle designated B, that circuit including pulse shaping networks PS and a pulse generator PG for transistorized firing of the controlled rectifiers SCR1–SCR6.

The D.C. power supply for the shunt field of the D.C. motor is developed across terminals 32 and 34 (bottom of FIG. 7A) by means of a shunt field supply circuit enclosed within the broken line rectangle C and comprising rectifiers or diodes D1, D2 and D3 operatively electrically connected to input terminals L1, L2 and L3, respectively, via lines 20, 22 and 24, respectively. Since sensing and control circuit A, trigger circuit B and shunt field supply circuit C are conventional and form no part of the present invention, they will not be specifically described herein.

Referring now to FIG. 10A, there is shown the identical six silicon controlled rectifiers SCR1–SCR6 operatively connected in a full wave configuration, phase controlled to achieve controlled turn on to an AC motor $M_{AC}$. The anode of SCR1 is connected to the cathode of SCR2 by line 80, the anode of SCR3 is connected to the cathode of SCR4 by line 82, and the anode of SCR5 is connected to the cathode of SCR6 by line 84. The input terminals for the three-phase alternating current are again designated L1, L2 and L3, respectively, and are connected to lines 80, 82 and 84, respectively. The cathode of SCR1 is connected to the anode of SCR2 by line 62, the cathode of SCR3 is connected to the anode SCR4 by line 64, and the cathode of SCR5 is connected to the anode of SCR6 by line 66, the three-phase output being taken off points 36, 38 and 40, respectively, on lines 62, 64 and 66, respectively, and connected to the motor $M_{AC}$ at output terminals T1, T2 and T3, respectively. The remainder of the circuitry again comprises a sensing and control circuit enclosed within the broken line rectangle A' and a trigger circuit schematically illustrated by the broken line rectangle B', both of which are conventional circuits and accordingly are not here specifically described. The control circuit A' here specifically illustrated is designed for control and sensing of the output current during starting of an A.C. motor. That circuit may of course be modified in known manner to provide for such control and sensing during steady state operation of an A.C. motor.

Figure 7B:
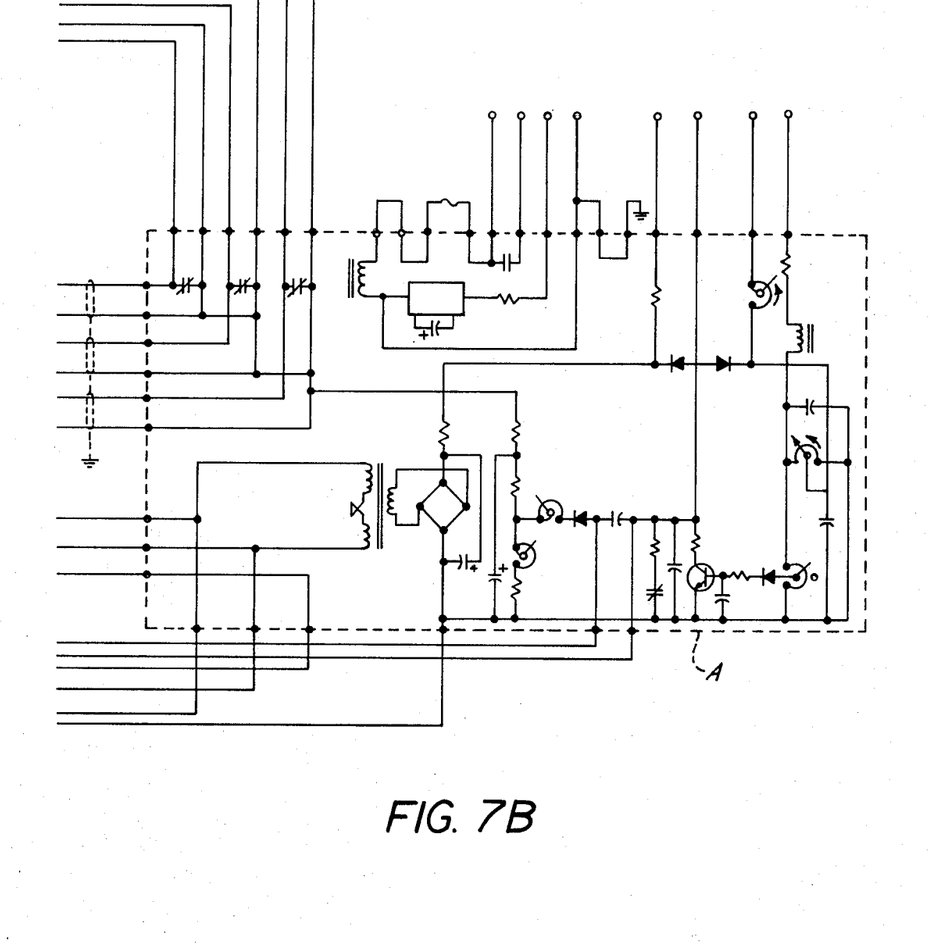

ONly so much of the circuitry in FIGS. 7A, 7B, 1hA and 10B as is believed to be relevant to the modular construction of the power section and to the novel A.C. and D.C. alternate bus bar arrangements have been described in any detail.

Figure 1:
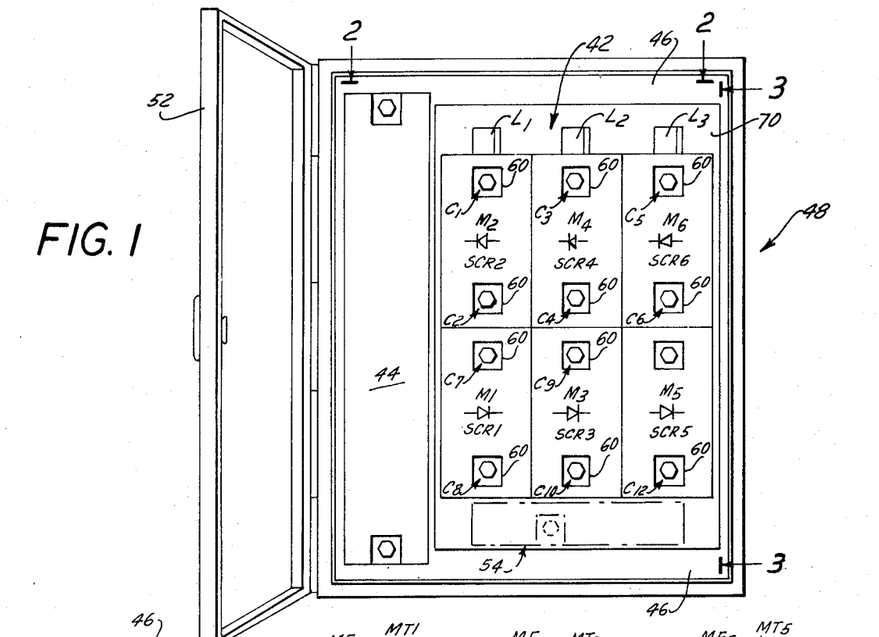
FIG. 1 is a front plan view of the illustrated embodiment of a power supply in accordance with this invention showing the enclosure door open and schematically showing a front view of the power handling and regulator units.

Turning now to the structure and arrangement of the power supply unit, as best illustrated in FIG. 1, that unit comprises a power section generally designated 42 and a regulator section generally designated 44, both of which are mounted on an insulating back panel 46 in a manner hereinafter described. The entire assembly is mounted within a cabinet 48 by means of suitable track means (not shown) with the appropriate electrical wiring extending through suitable apertures in the back wall 50. The unit is substantially centered within the cabinet enclosure substantially spaced from the top and bottom walls for improved heat dissipation, the unit being conveniently accessible at the front by a swingable door 52. The cabinet 48 may be provided with slots or louvres (not shown) for improved convective heat dissipation.

The regulator section 44 is a self-contained unit and contains substantially all the components of the control and sensing circuit (rectangles A and A' in FIGS. 7B and 10B, respectively) and the trigger circuit (rectangles B and B' in FIGS. 7A and 10A, respectively). In addition, in the D.C. embodiment (FIG. 7A) a shunt field power section generally designated 54 is preferably provided below the power section as shown, that section containing the circuitry shown in rectangle C in FIG. 7A (the diodes D1–D3 being connected to input terminals L1–L3, respectively, by appropriate wiring—not shown).

Figure 2:
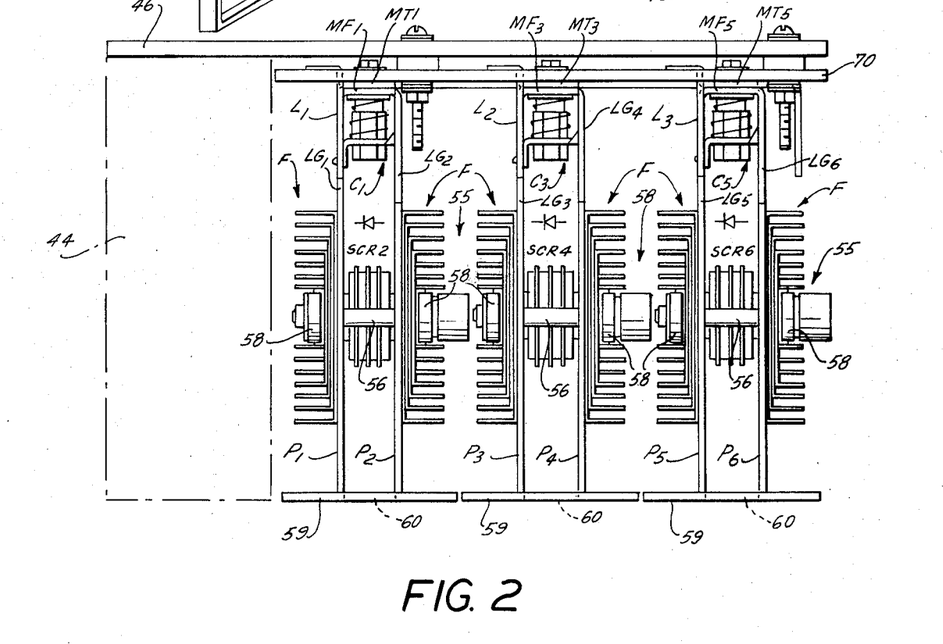
FIG. 2 is a cross sectional view taken along the lines 2—2 of FIG. 1.
Figures 3, 4:
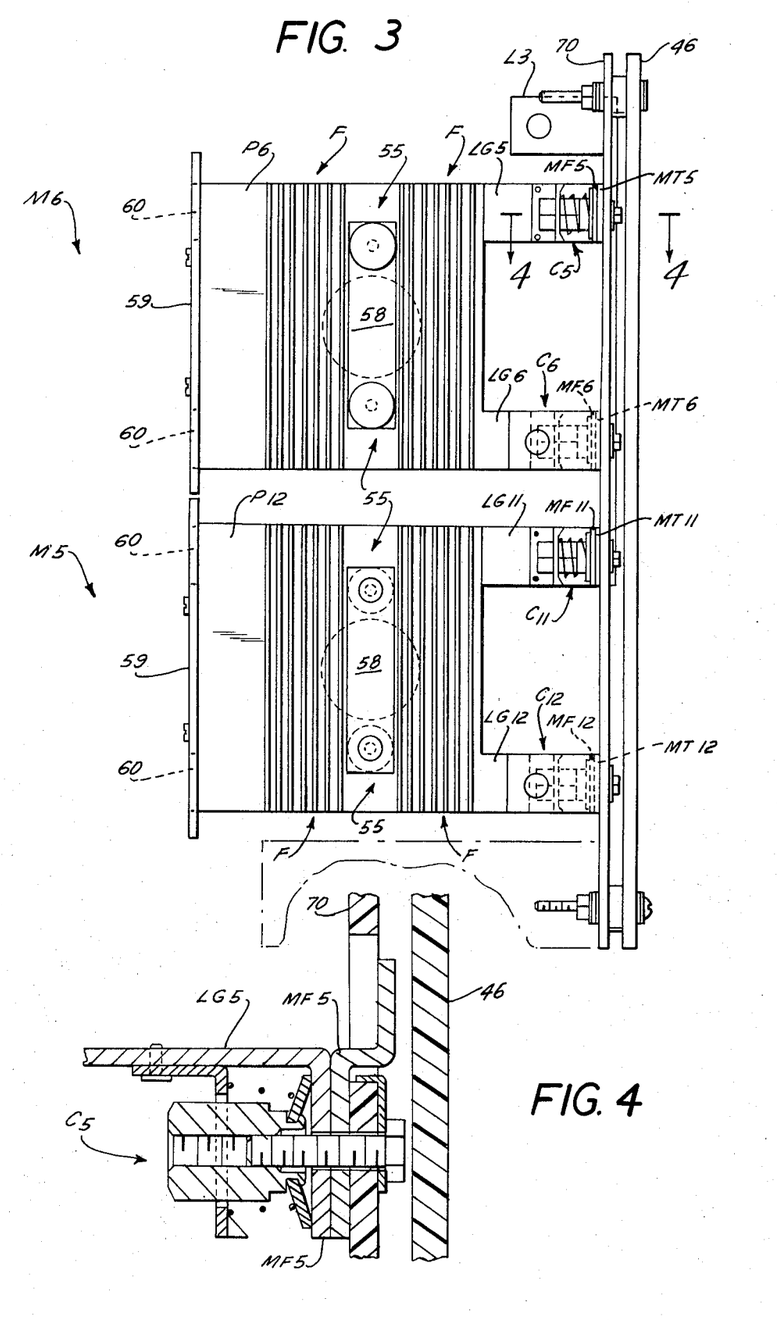
FIG. 3 is a cross sectional view taken along the lines 3—3 of FIG. 1.
FIG. 4 is an enlarged fragmentary cross sectional view taken along the lines 4—4 of FIG. 3.

As best illustrated in FIGS. 1–3, the power section 42 comprises six individual modules here designated M1–M6, containing the six silicon controlled rectifiers SCR1–SCR6, respectively. The rectifiers SCR2, SCR4 and SCR6 of the three upper modules M2, M4 and M6 in FIG. 1 are illustrated in FIG. 2 and correspond, respectively, to the like designated components illustrated schematically in the circuit diagram of FIGS. 7A and 10A. (Similarly, the bottom row of rectifiers SCR1, SCR3 and SCR5 correspond to the like designated elements in FIGS. 7A and 10A.)

AS shown in FIG. 2, those SCRs are each operatively mounted between two heavy electrically and thermally conductive plates P. A plurality of heat dissipating fins generally designated F are mounted on the oppositely facing outer surfaces of each pair of plates P and extend outwardly thereof in vertically spaced relation for increased heat dissipation. Each pair of plates P mounting an SCR, together with its heat dissipating fins F are connected in operative relationship as shown by a bolt assembly 55 comprising a pair of bolts 56 disposed at either side of the SCR and extending through registering apertures in the plates P, fins F and a pair of horizontal fastener bars 58. The bolt assembly 55 is substantially identical to that disclosed in the copending application of Lance C. Wilcox, Ser. No. 887,542 filed Dec. 23, 1969 and assigned to the assignee of this invention, and accordingly will not be here described in any great detail. Suffice it to say that this assembly is specifically designed to provide good electrical and heat conductive engagement between the SCRs and plates P, to maintain the SCRs firmly mounted therebetween, to maintain electrical isolation between the plates P (to prevent shorting of the SCRs) and yet to insure that the clamping pressure is below that effective to damage the SCRs or otherwise modify their operating characteristics.

As best shown in FIGS. 2 and 3, mounting plates P are generally square and each is formed with an elongated leg LG coextensive with one edge thereof and having a right angle mounting foot MF adapted to be mounted on and secured to the appropriate bus bar structure hereinafter described, by a quick detachable captive nut assembly C. The assembly preferably used is shown in the enlarged cross sectional view of FIG. 4 and is identical to hat disclosed in Ettinger et al. U.S. Pat. No. 3,490,509 issued Jan. 20, 1970, entitled "Captive Nut Assembly," and assigned to the assignee of the present invention. The disclosure of that patent is incorporated into this application by reference, it being understood that the specific structure there disclosed (and here illustrated in FIG. 4), while believed to be exceedingly advantageous in facilitating rapid connection and disconnection of the individual modules M to and from he bus bar structure, is not essential to those aspects of the invention herein described and claimed.

AS best shown in FIGS. 2 and 3, all the mounting plates P are identical. However, the plates of each pair mounting an SCR are disposed facing opposite each other with their legs LG at opposite sides thereof, the for feet MF of each pair facing inwardly toward each other.

As best illustrated in FIGS. 1 and 2, each module is provided with a front panel 59 of insulating material having a pair of spaced apertures 60, one of which is in registration with the captive nut assembly C associated with one of its mounting feet Mf and the other of which is in registration with the captive nut assembly C associated with the other of its mounting feet MF. (For convenience, the associated plates P, legs LG, mounting feet MF and captive nut assemblies C are correspondingly numbered from 1–12.) Those apertures are of a size sufficient said base the passage therethrough of a suitable wrench used to attach or detach the mounting feet MF to or from the bus bar structure on the back panel. Accordingly, each module M may be quickly and conveniently attached to or detached from the unit in toto. In addition, spaced apertures 60 serve to define a handle which may be gripped by inserting one's fingers therethrough fro handling the module.

The front plate 59 preferably contains indicia including an indication of the orientation of the SCRs contained therein. As shown schematically in FIG. 1, the bottom three modules M1, M3 and M5 are disposed with their SCRs facing to the right (anode to cathode) while the top three modules M2, M4 and M6 are oppositely disposed with their SCRs facing to the left (anode to cathode). (This schematic marking is merely for the purpose of illustration—in practice the indicia preferably shows the SCRs facing up and down in accordance with the orientation of the mounting feet MF to indicate operative electrical connection between bus bars, as hereinafter described thereby to facilitate assembly. Under this system the indicia on the upper row of modules would show the cathodes at the top while the indicia on the lower row of modules would show the cathodes at the bottom.)

Figure 7C:
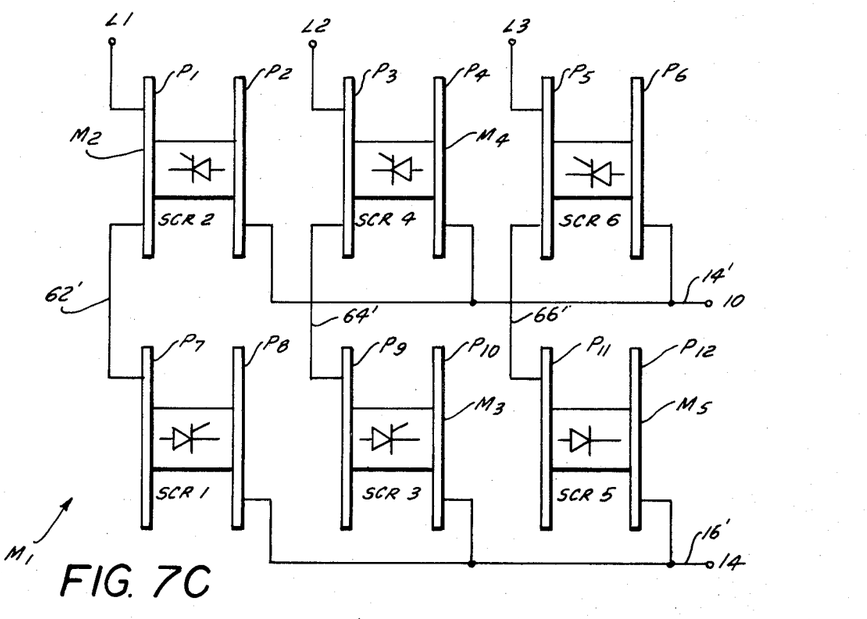
FIG. 7C is a schematic illustration of the disposition of the power handling rectifiers between heat dissipating plates and the bus bar connection thereof for D.C. operation.

The connections which must be made (by bus bars) between plates P for the D.C. circuit (FIG. 7A) are illustrated schematically in FIG. 7C. As there shown, plates P1, P3 and P5 are operatively electrically connected to input terminals L1, L2 and L3, respectively. In addition, plates P1 is connected to plate P7 by line 62'; plate P3 is connected to plate P9 by line 64'; plate P5 is connected to plate P11 by line 66'; plates P2, P4 and P6 are all connected to common line 14', and plates P8, P10 and P12 are all connected to common line 16' (all lead lines correspond to like numbered lead lines in FIG. 7A, with the exception of the prime).

Figure 5:
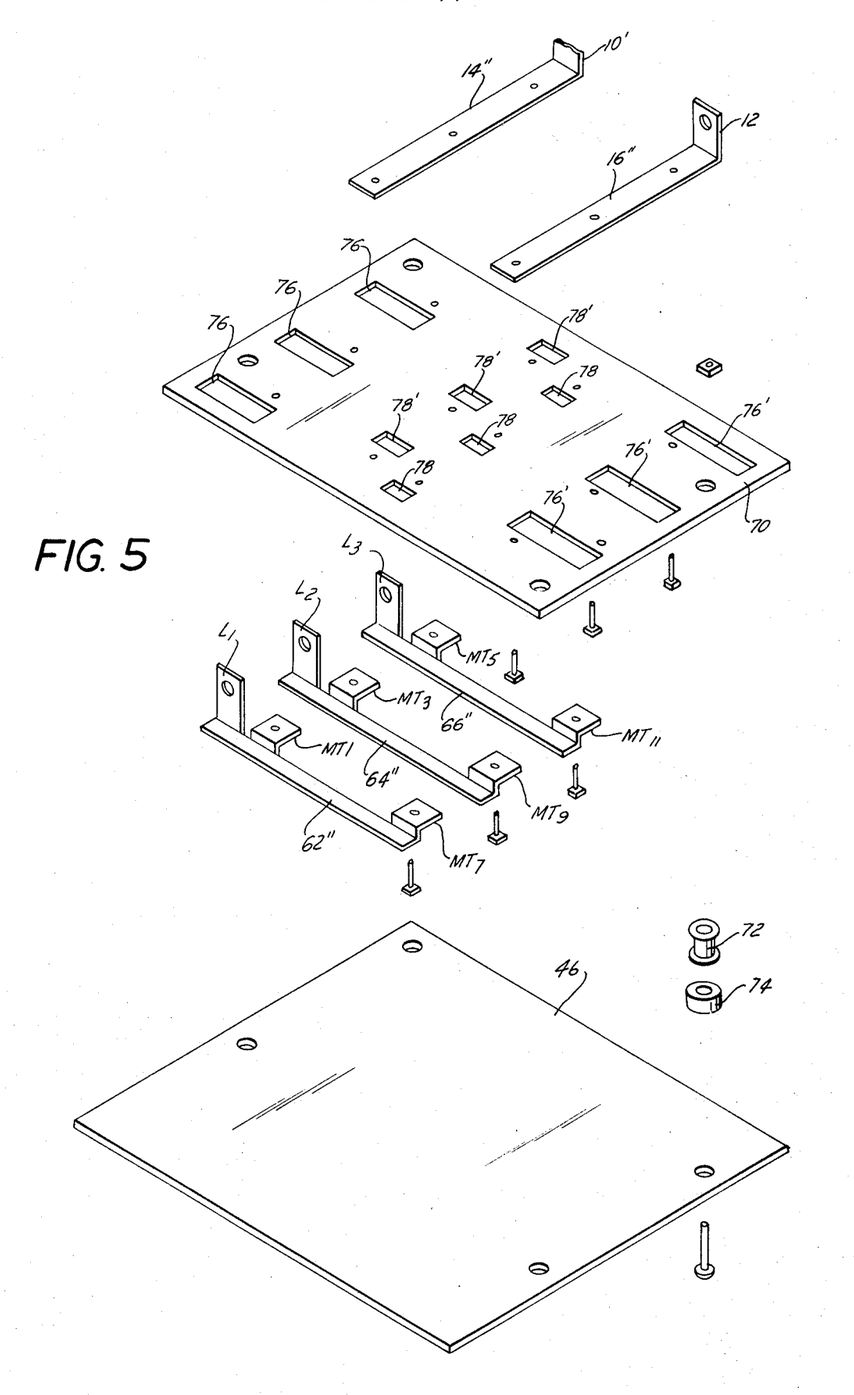
FIG. 5 is an exploded perspective view of the back panel and bus bar mounting configuration for D.C. operation of the unit of FIG. 1.

The bus bar structure for making the above described connections is illustrated in FIG. 5. As there shown in exploded view a mounting plate 70 of insulating material is disposed over the back panel 46 (also of insulating material) and mounted thereon in spaced relationship by a metallic grommet 72, extending through registering apertures at four corner locations of plates 46 and 70. A thick circular washer or spacer member 74 made of electrically insulating material is mounted concentrically on each grommet 72 between plate 70 and panel 46 and is effective both to maintain the spacing therebetween and also to maintain metallic grommets 72 electrically isolated from the bus bar structure described below. (A nut and bolt assembly extending through grommet 72 may be provided for increased rigitidy.) Insulating plate 70 is provided with a plurality of bus bar mounting apertures. As illustrated, three generally elongated rectangular apertures or slots 76 and 76' are provided in spaced relationship along opposite edges of the plate 70, the apertures 76 at one edge being staggered with respect to the apertures 76' at the other edge. Similarly, two rows of three smaller apertures 78 and 78' are provided generally centrally of the plate in staggered relationship. The D.C. bus bar structure comprises three parallel buses 62", 64" and 64" extending generally parallel to the slots 76 and 78 and provided with upstanding terminals at one end thereof which terminals constitute the three-phase A.C. input terminals L1, L2 and L3 in FIG. 7A. In addition, each bus is provided with a pair of right angle mounting tabs MT, one of which is located directly adjacent the input terminal L and the other of which is located at the end of the bus bar opposite the terminal L.

In the assembled condition, the elongated buses 62', 64' and 66' are sandwiched between back panel 46 and mounting plate 70, the upstanding terminals L1, L2 and L3 and the mounting tabs MT1, MT3 and MT5 extending through the apertures 76 in plate 70 and the mounting tabs MT7, and MT9 and MT11 extending through the apertures 78 in mounting plate 70. Those mounting tabs are raised from the level of the buses themselves by a distance equal to the thickness of insulating plate 70 and extend over the upper surface of that insulating plate beyond the edge of the apertures (see FIG. 6). A pair of parallel bus bars 14" and 16" are disposed on the top surface of mounting plate 70 generally perpendicular to bus bars 62", 64" and 66" and are provided at one end with upstanding terminals 10' and 12' corresponding to the output terminals 10 and 12 in the circuit diagram of FIG. 7A.

For purposes of orientation the input terminals L1, L2 and L3 and the output terminals 10' and 12' are illustrated schematically in proper position on mounting plate 70 in FIG. 1. Accordingly, referring to FIG. 1, FIG. 2 and FIG. 5, it will be apparent for example that mounting foot MF1 on plate P1 is disposed in registration with and operatively electrically secured on mounting tab MT1 of bus bar 62" in the manner illustrated in FIG. 4. Likewise, mounting foot MF3 on mounting plate P3 is secured to mounting tab MT3 on bus bar 64" and mounting foot MF5 on mounting plate P5 is secured to mounting tab MT5 on bus bar 66". In a like manner the mounting feet MF7, MF9 and MF11 of plates P7, P9 and P11 are secured to mounting tabs MT7, MT9 and MT11. Accordingly, bus bars 62", 64" and 66" correspond respectively to the like number lead lines in FIGS. 7C and 7A (with the exception of the primes).

Similarly, as perhaps best shown in FIG. 3, the mounting feet MF2, MF4 and MF6 of plates P2, P4 and P6 are secured to the common bus bar 14" while the mounting feet MF8, MF10 and MF12 on plates P8, P10 and P12 are secured to the common bus bar 16", those bus bars again corresponding to the like numbered lead lines in FIGS. 7A and 7C. As best illustrated schematically in FIG. 6, the resulting circuit established by the bus bar connections of FIG. 5 is identical to that shown in the circuit diagram of FIG. 7A. It will be apparent that bus bar 14" crosses over bus bars 64" and 66" but is effectively electrically insulated from same by the insulating mounting plate 70.

Figure 8:
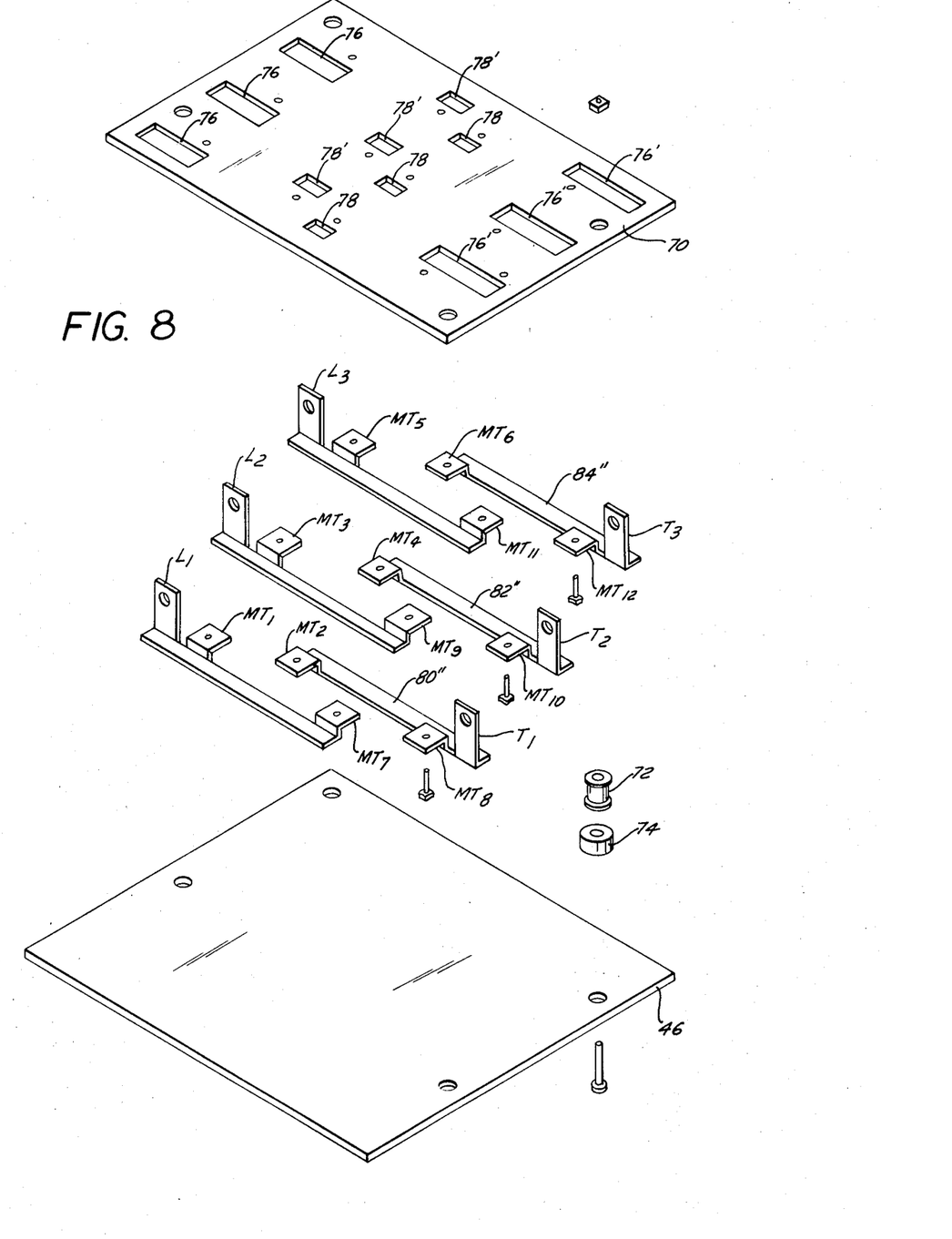
FIG. 8 is an exploded perspective view of the back panel and bus bar mounting configuration for A.C. operation of the unit of FIG. 1.
Figure 9:
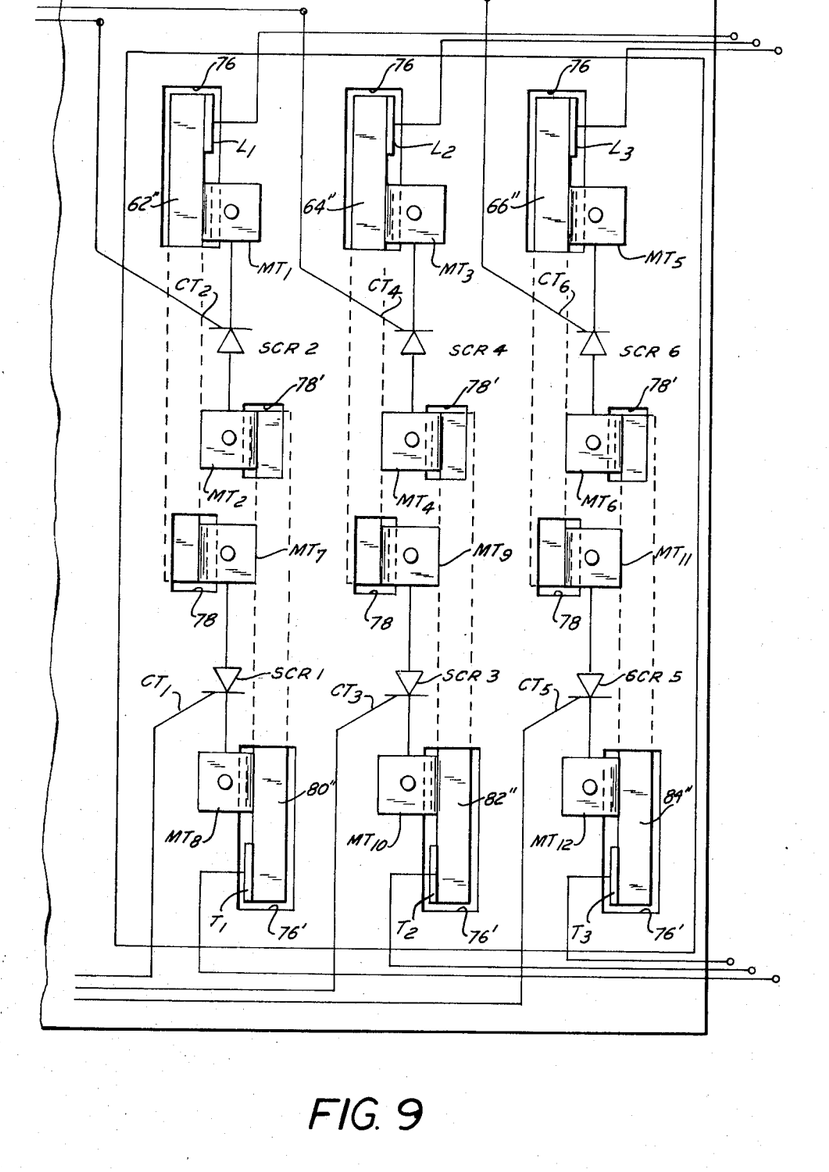
FIG. 9 is a schematic illustration of the bus bar mounting structure of FIG. 8 with the operative solid state power handling components schematically illustrated in proper electrical connection thereto.
Figure 10C:
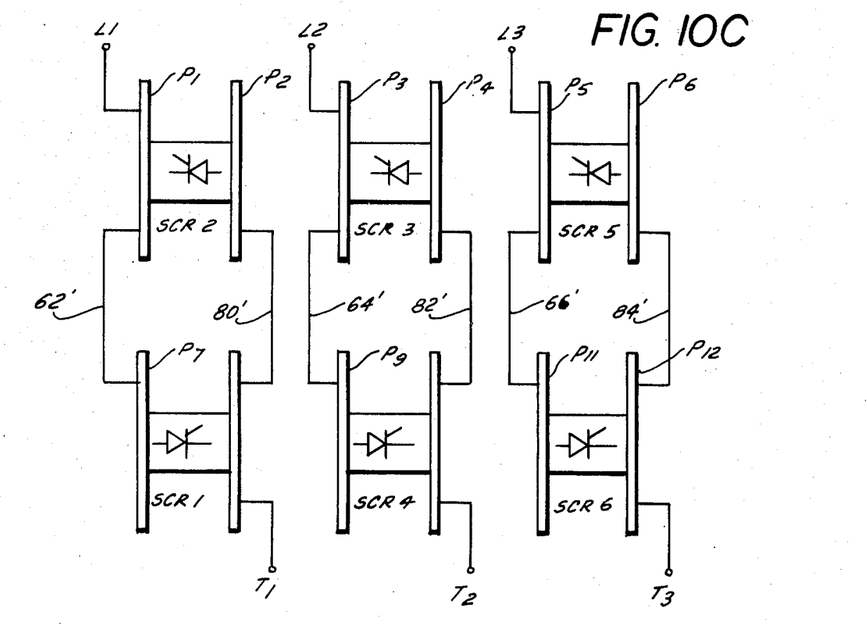
FIG. 10C is a schematic illustration similar to FIG. 7C of the disposition of the power handling rectifiers for A.C. operation.

In order to convert the power section from the D.C. configuration just described to the A.C. configuration illustrated by the circuit diagram of FIG. 10A, it is merely necessary to replace the bus bar assembly shown in FIG. 5 with that shown in FIG. 8. As there shown this assembly utilizes the same back panel 46 and the same insulating mounting plate 70. In addition, bus bars 62", 62" and 66" remain bus bars 14" and 16" are removed from the upper surface of mounting plate 70 and replaced by the three bus bars designated 80", 82" and 84" (sandwiched between plates 46 and 70). As illustrated, those bus bars are identical to bus bars 62", 64" and 66" but are positioned in oppositely facing and staggered relationship therewith thereby to form the circuit arrangement to FIG. 9, the upstanding terminals T1, T2 and T3 and mounting tabs in MT8, MT10 and MT12 extending through apertures 76' and mounting tabs MT2, MT4 and MT6 extending through apertures 78' in mounting plate 70. Again it will be apparent that the circuit thus established as schematically illustrated in FIG. 9 corresponds identically to that illustrated in FIGS. 10A and 10C, the bus bars 80", 82" and 84" corresponding to the like numbered lead lines in those figures (with the exception of the primes). Referring to FIGS. 8 and 9, it will be seen that aligned mounting tabs MT2, MT4 and MT6 replace the common bus bar 14" (FIGS. 5 and 6) and are operatively secured to mounting feet MF2, MF4 and MF6, respectively. Likewise, mounting tabs MT8, MT10 and MT12 replace common bus bar 16" and are operatively secured to mounting feet MF8, Mf10 and MF12, respectively. The resulting circuit arrangement is schematically illustrated in FIG. 10C wherein the primed lead lines correspond to the like numbered double primed bus bars in FIGS. 8 and 9. Referring to FIG. 9, it will be appreciated that while the inner oppositely facing mounting tabs (i.e., MT2 and MT7) of adjacent bus bars (i.e., 62" and 80") extend substantially to the edge of the opposite bus bar in overlapping relationship, those tabs are separated from the underlying buses by the thick insulating mounting plate 70, thereby to provide good electrical isolation.

Figure 6:
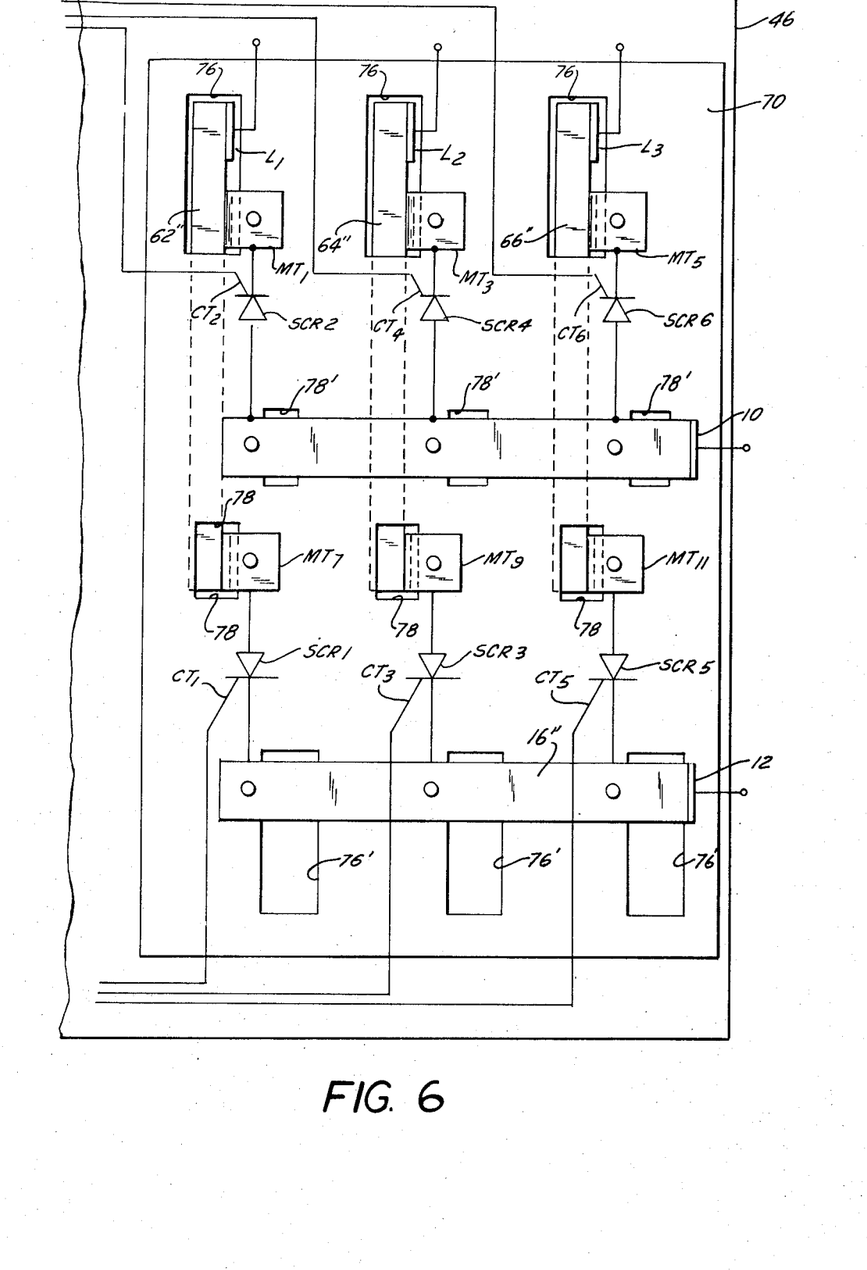
FIG. 6 is a schematic illustration of the bus bar mounting structure of FIG. 5 with the operative solid state power handling components schematically illustrated in proper electrical connection thereto.

Comparing FIGS. 6 and 9, it will be appreciated that while the rectifiers SCR1-SCR6 are disposed in precisely the same positions on the mounting panel 70, the slight change in bus bar configuration discussed above is effective to provide the two quite different power circuits of FIGS. 7A and 10A, respectively, thereby to adapt the unit for either D.C. or A.C. operation, respectively, depending upon which bus bar structure is utilized. The resulting versatility contributes significantly to a reduction of the initial costs together with a reduction of the time and expense involved in maintenance and repair. Thus, for example, in accordance with this invention, a D.C. unit may be converted to an A.C. unit for the cost of a new rectifier section 44, and three additional bus bars. And because of the simplicity of the mounting structure this may be easily accomplished by relatively unskilled personnel. Moreover, the power modules (the most expensive part of the unit) are interchangeable, so that the same standby module may be used for either a D.C. or an A.C. unit. Finally, as a result of the structural identity of many of the components here involved, units of this type may be manufactured at substantially lower cost.

While only a single embodiment of the present invention has herein been specifically described, it will be appreciated that many variations may be made therein without departing from the scope of the invention, as defined in the following claims.

We claim:

1. In a power supply unit for converting a multiphase alternating supply current to either an A.C. or D.C. controlled output current, a power section comprising a base panel of insulating material, a plurality of discrete modules, each of said modules comprising a pair of spaced electrically and thermally conductive plates, a controlled rectifier mounted and electrically connected between said pair of plates, means on said base panel for mounting a plurality of bus bars in selectively different arrangements to define at least first or second bus bar assemblies, and means for mounting said modules on said base panel and electrically connecting them to appropriate points on said bus bars, said first bus bar assembly when so mounted operatively connecting said controlled rectifiers in series-connected anode-to-cathode pairs, said pairs being connected in parallel between a pair of input terminals, said second bus bar assembly when so mounted operatively connecting said controlled rectifiers in independent closed loop pairs, the anode and cathode of one of said rectifiers in a pair being connected to cathode Pathode and anode, respectively, of the other rectifier in said pair said rectifiers in each pair being operatively connected in parallel in oppositely facing directions between an input terminal and an output terminal.

2. The power supply unit of claim 1, wherein said modules are adapted to be operatively mounted on said base with respect to either said first or second bus bar assembly in substantially identical orientation and location relative to said base panel.

3. The power supply unit of claim 1, wherein said module mounting means comprises a conductive leg extending from said plate and having a laterally extending mounting foot adapted to engage said bus bar structure in surface-to-surface heat and electrically conductive relationship, and means detachably securing said mounting feet to said bus bar structure.

4. The power supply unit of claim 3, wherein said legs on each pair of mounting plates are spaced from each other in a direction along said plates and wherein said mounting feet on said spaced legs extend inwardly in opposite directions to a position substantially aligned between said pair of plates and spaced in the direction of said plates.

5. The power supply unit of claim 4, wherein said mounting feet securing means comprises a captive nut assembly associated with each of said mounting feet and wherein said modules each have a front panel disposed generally perpendicular to said mounting plates, said front panel having spaced apertures aligned with said spaced mounting feet, whereby said captive nut assemblies are accessible through said front panel, said apertures being further effective to provide a handle for handling said modules.

6. The power supply unit of claim 5, wherein said modules are adapted to be operatively mounted on said base with respect to either said first or second bus bar assembly in substantially identical orientation and location relative to said base panel.

7. The power supply unit of claim 3, wherein said mounting means comprises a mounting panel of electrically insulating material, means securing said mounting panel on said base panel in spaced relationship therewith, a plurality of apertures in said mounting panel, said first and second bus bar assemblies comprising a plurality of elongated bus bars at least some of which are sandwiched between said base panel and said mounting panel and having mounting tabs extending through said apertures in said mounting plate into engagement with said mounting feet on said modules.

8. The power supply unit of claim 7, wherein said legs on each pair of mounting plates are spaced from each other in a direction along said plates and wherein said mounting feet on said spaced legs extend inwardly in opposite directions to a position substantially aligned between said pair of plates and spaced in the direction of said plates.

9. The power supply unit of claim 8, wherein said mounting feet securing means comprises a captive nut assembly associated with each of said mounting feet and wherein said modules each have a front panel disposed generally perpendicular to said mounting plates, said front panel having spaced apertures aligned with said spaced mounting feet, whereby said captive nut assemblies are accessible through said front panel, said apertures being further effective to provide a handle for handling said modules.

10. The power supply unit of claim 9, wherein said modules are adapted to be operatively mounted on said base with respect to either said first or second bus bar assembly in substantially identical orientation and location relative to said base panel.

11. The power supply unit of claim 7, wherein at least some of said bus bars of said first or second bus bar assemblies are disposed over said mounting panel and cross over others of said bus bars under said mounting panel.

12. The power supply unit of claim 5, wherein at least some of said bus bars of said first or second bus bar assemblies are disposed over said mounting panel and cross over others of said bus bars under said mounting panel.

13. The power supply unit of claim 7, wherein said mounting plate securing means comprises electrically conductive fastening means extending through said base panel and said mounting panel, and insulating spacer means mounted concentrically on said fastening means between said base panel and said mounting panel and effective to electrically isolate said fastening means from said bus bars thereby to prevent high voltage arcing.

14. The power supply unit of claim 13, wherein at least some of said bus bars of said first or second bus bar assemblies are disposed over said mounting panel and cross over others of said bus bars under said mounting panel.

15. The power supply unit of claim 14, wherein said legs on each pair of mounting plates are spaced from each other in a direction along said plates and wherein said mounting feet on said spaced legs extend inwardly in opposite directions to a position substantially aligned between said pair of plates and spaced in the direction of said plates.

16. The power supply unit of claim 15, wherein said mounting feet securing means comprises a captive nut assembly associated with each of said mounting feet and wherein said modules each have a front panel disposed generally perpendicular to said mounting plates, said front panel having spaced apertures aligned with said spaced mounting feet, whereby said captive nut assemblies are accessible through said front panel, said apertures being further effective to provide a handle for handling said modules.

17. The power supply unit of claim 16, wherein said modules are adapted to be operatively mounted on said base with respect to either said first or second bus bar assembly in substantially identical orientation and location relative to said base panel.

* * * * *